United States Patent [19]

Meredith

[11] 4,411,590
[45] Oct. 25, 1983

[54] CONTROL SYSTEM FOR VARIABLE SPEED BELT DRIVES

[75] Inventor: Richard L. Meredith, Mishawaka, Ind.

[73] Assignee: Reliance Electric Company, Mishawaka, Ind.

[21] Appl. No.: 214,196

[22] Filed: Dec. 8, 1980

[51] Int. Cl.³ .............................................. F01B 25/02
[52] U.S. Cl. ....................................... 415/26; 415/13; 474/28
[58] Field of Search ................. 415/13, 26, 122 R, 18, 415/23; 474/28

[56] References Cited

U.S. PATENT DOCUMENTS

| | | | |
|---|---|---|---|
| 2,339,150 | 1/1944 | Codrington | 415/26 |
| 2,346,868 | 4/1944 | Perry | 474/28 |
| 2,390,487 | 12/1945 | Lawrence et al. | 415/26 X |
| 2,485,126 | 10/1949 | Wood | 415/26 |
| 2,887,894 | 5/1959 | Charlat | 474/28 |
| 3,173,607 | 3/1965 | Pringle | 415/122 |
| 4,089,232 | 5/1978 | Llach et al. | 474/28 |

FOREIGN PATENT DOCUMENTS

| | | | |
|---|---|---|---|
| 7907714 | 4/1981 | Netherlands | 474/28 |
| 843047 | 8/1960 | United Kingdom | 474/28 |
| 2033502 | 5/1980 | United Kingdom | 474/28 |
| 2058257 | 4/1981 | United Kingdom | 474/28 |
| 2064686 | 6/1981 | United Kingdom | 474/28 |

OTHER PUBLICATIONS

Powers Regulator Company, "Technical Instruction", RL 147-2, Oct. 1975, pp. 1-8.

*Primary Examiner*—Philip R. Coe
*Assistant Examiner*—Frankie L. Stinson
*Attorney, Agent, or Firm*—Marmaduke A. Hobbs

[57] ABSTRACT

A control system primarily for variable speed drives having input and output sheaves with axially movable flanges and a belt interconnecting the sheaves, in which a fluid actuating mechanism moves the flange on the input sheave to vary the pitch thereof, and consequently, the output speed of the drive. A fan or other fluid pressure creating device, is driven by the output element of the drive and is connected to a control mechanism which is responsive to a condition sensing device for providing a pressure varying according to the condition to be maintained. The control mechanism is connected to a source of operating pressure and is regulated by the pressure from the pressure creating device and the condition sensing device for varying the pressure in the pressure actuating mechanism to vary the position of one of the movable flanges and thereby control the output speed of the drive.

17 Claims, 4 Drawing Figures

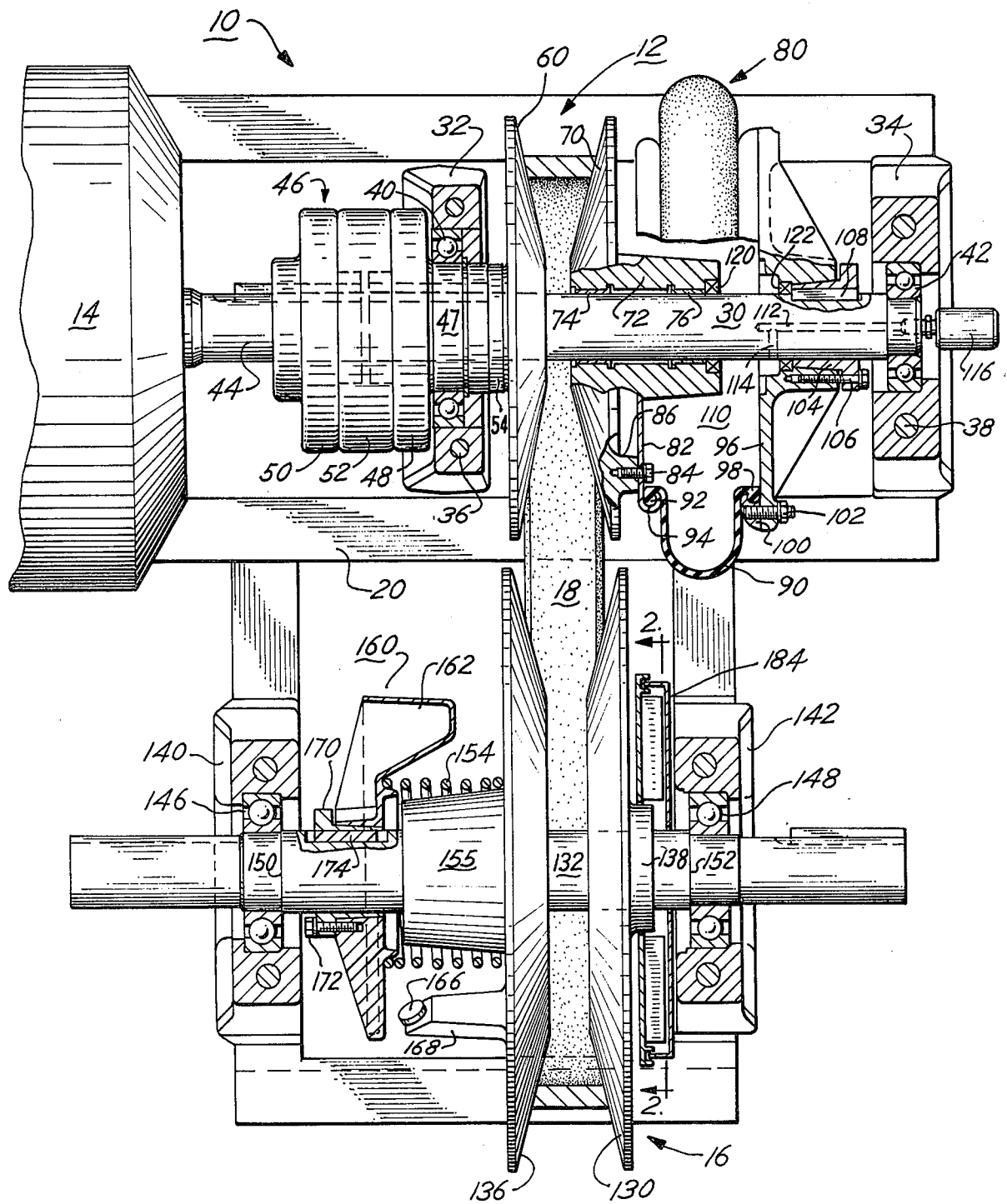

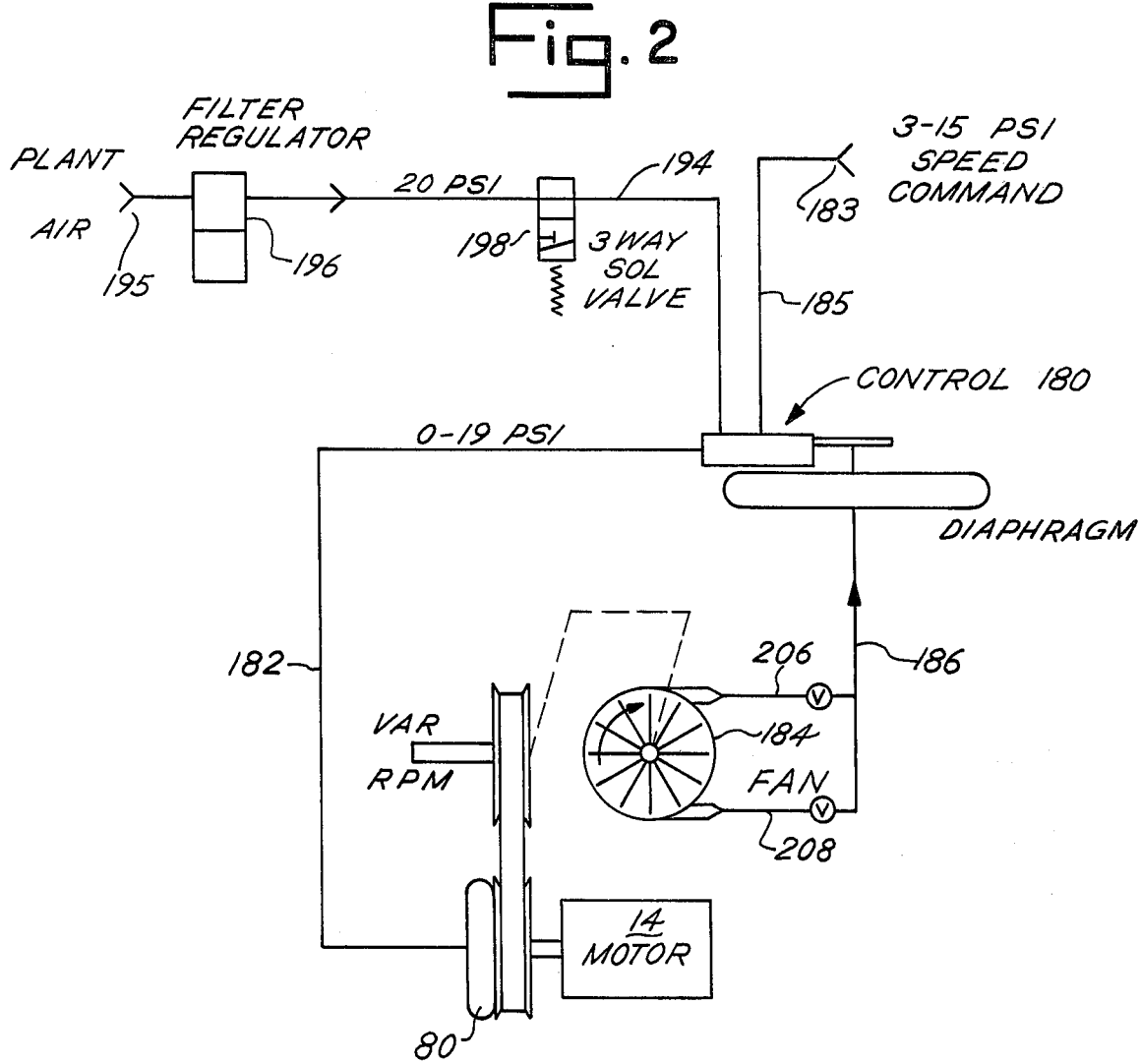
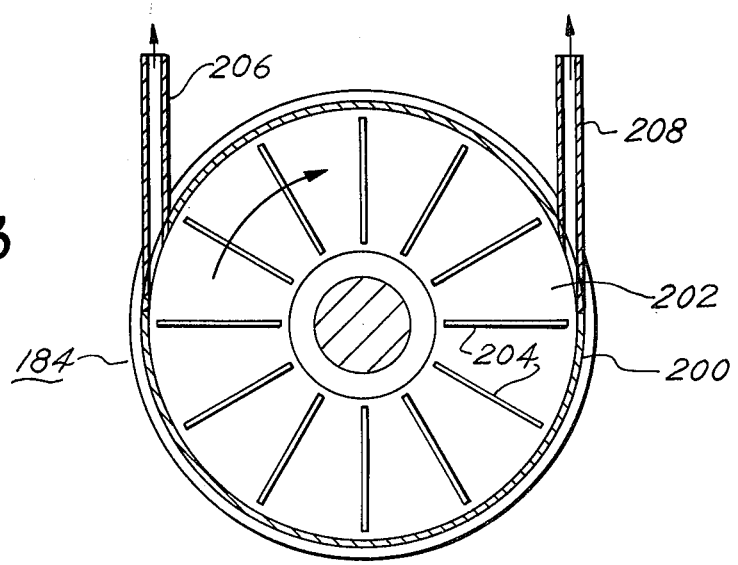

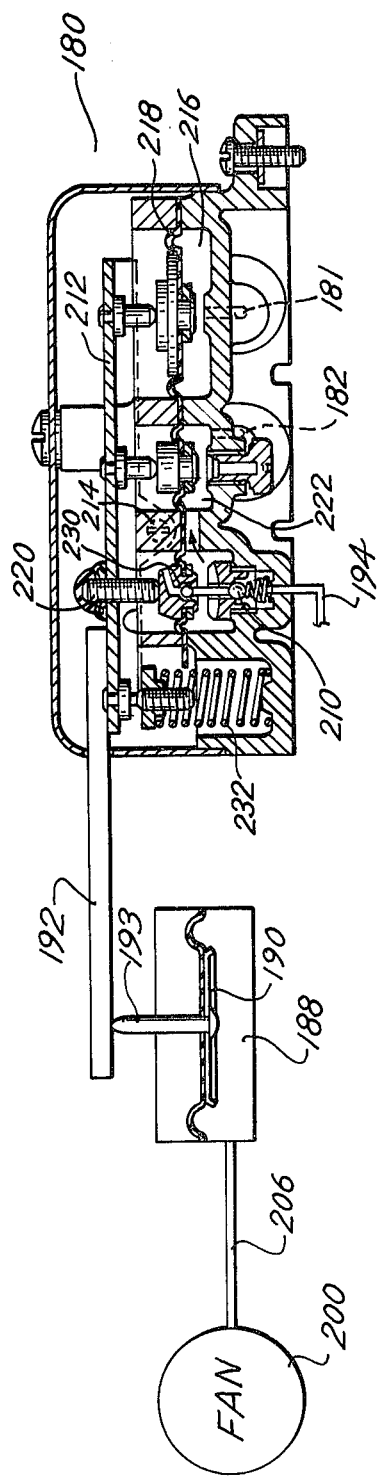

CONTROL SYSTEM FOR VARIABLE SPEED BELT DRIVES

BACKGROUND OF THE INVENTION

A widely used variable speed belt drive consists of a pair of sheaves and a belt interconnecting the sheaves in which one of the flanges on at least one of the sheaves is mounted on an axially movable hub and is adjustable toward and away from the other flange. The hub is mounted on a shaft, and a keying device, such as a key and key ways, interconnects the flange, hub and shaft and prevents relative rotation therebetween. The adjustable sheave is varied by an operator or in response to a control signal, and the other sheave automatically adjusts itself to accommodate the adjustment made in the first sheave. In a modification of this basic type, one of the sheaves is variable and the other is moved relative to the adjustable sheave to compensate for variations in the effective belt length when the adjustment in the speed is made.

Various types of mechanisms and systems have been used for adjusting the movable flange of the variable pitch sheave or sheaves. These include mechanical types, manually operated or power driven, or hydraulic types. In both the mechanical and hydraulic types of prior adjustment mechanisms, the movable flange is keyed to the shaft and is adapted to move axially on the shaft in response to changes in the setting on the adjustment mechanism therefor. These adjustment mechanisms and systems function satisfactorily under normal operating conditions while the drives are in good condition, but they often become unreliable or inoperable from fretting and scoring of the shaft and keys. In order to overcome this difficulty, plastic bushings disposed between the shaft and the hub of the movable flange, and in some instances along the keys, have been used; however, the basic reason for the adverse condition developing along the keys is not eliminated by these bushings, although the problem may be somewhat alleviated. Further, the hydraulic system for adjusting the movable flange is often relatively complicated and difficult to maintain in optimum operating condition.

A more recent development, which is disclosed in copending applications Ser. No. 183,627, filed Sept. 2, 1980, and Ser. No. 191,316, filed Sept. 26, 1980, involves the use of a fluid operated device, consisting of a flexible torsion and fluid pressure device of annular shape disposed around the constant speed shaft of the variable speed belt drive adjacent the movable flange thereof, for performing the dual function of controlling the axial position of the movable flange and, at the same time, of coupling the movable flange to the shaft on which it is mounted. A system which is responsive to some predetermined operating condition or a preset speed, controls the operation of the fluid operated device to move the flange to the position required to obtain the desired performance of the drive. The fluid operated device is so constructed and designed that, when coupled to the shaft and movable flange, the torque is transmitted between the shaft and flange without a key or other element directly connecting the two components, and the device is capable of use merely as the coupling element between the shaft and flange or merely as a fluid controlled element for adjusting the movable flange axially on the shaft.

SUMMARY OF THE INVENTION

One of the primary objects of the present invention is to provide a control system for a variable speed drive having adjustable pitch drive and driven sheaves with an axially movable hub, which will effectively and readily adjust the sheave to obtain a desired operating speed under various operating conditions, and which is responsive to slight variations in the output speed of the drive to maintain a preselected drive speed within a relatively narrow range. The present invention involves the use of a fluid operated device, preferably consisting of a flexible torsion device of annular shape disposed around the shaft of the variable speed belt drive adjacent the movable flange thereof, for performing the dual function of controlling the axial position of the movable flange and, at the same time, of coupling the same flange to the shaft on which it is mounted. A system which is responsive to some predetermined operating condition or a preset speed, controls the operation of the fluid operated device to move the flange to the position required to obtain the desired performance of the drive. The fluid operated device is so constructed and designed that, when coupled to the shaft and movable flange, the torque is transmitted between the shaft and flange without a key or other element directly connecting the two components. However, the device is capable of use merely as the coupling element between the shaft and flange or merely as a fluid controlled element for adjusting the movable flange axially on the shaft.

Another object is to provide a control system for a variable pitch sheave of the aforementioned type which can be easily fabricated, assembled and installed, using standard equipment and tools, and which can thereafter be readily serviced and repaired in the field, using easily installed and assembled parts and subassemblies.

Still a further object of the invention is to provide a control system for a variable pitch sheave which is so constructed and designed that the parts thereof will withstand long continued operation with minimal servicing and without developing any adverse condition, such as vibration or hunting, which would interfere with the operation of the drive, thereby eliminating frequent replacement of parts or the complete unit.

Still a further object of the invention is to provide a variable speed drive which is so constructed and designed that it will provide optimum performance under long continued operation and under adverse conditions, such as heavy loads and frequent changes in the load and in variations in output speed.

Objects and advantages of the present variable speed drive, in addition to those recited hereinbefore, will become apparent from the following description and accompanying drawings.

BRIEF DESCRIPTION OF THE DRAWINGS

FIG. 1 is a top plan and partial cross sectional view of a variable speed drive controlled by the system embodying the present invention;

FIG. 2 is a schematic diagram of the present control system, including parts of the variable speed drive shown in FIG. 1;

FIG. 3 is an enlarged cross sectional view of a pressure creating device used in conjunction with the present control system; and FIG. 4 is an enlarged cross sectional view of a control device forming a part of the present control system.

DESCRIPTION OF THE PREFERRED EMBODIMENT

Referring more specifically to the drawings, the variable speed drive for which the present control system is primarily intended is shown in detail. Numeral 10 indicates generally the present variable speed belt drive having a constant speed drive sheave assembly 12, an electric motor 14 for driving the sheave assembly 12, a variable speed sheave assembly 16 adapted to be connected to the equipment to be driven by the variable speed drive, and a wide V-belt 18 trained on the sheaves of the two assemblies for transmitting the power from the sheave assembly 12 to sheave assembly 16. The motor and two sheave assemblies are mounted on a base 20 which forms a unitary structure of the three principal components. The motor may be considered conventional for the purpose of the present invention and has a base secured to the drive base 20 by a plurality of bolts extending downwardly through the motor base and through a flange on the upper side of drive base 20. Since the motor is conventional and various makes and models can be used in the drive, further description of the motor will not be given herein.

The construction of the sheave assembly 12 is best seen in FIG. 1 and consists of a shaft 30 journaled in pillow blocks 32 and 34 secured by bolts 36 and bolts 38 of the two pillow blocks, respectively, extending downwardly through the lower part of the respective pillow blocks and through the upper flange of base 20, thereby securing the two pillow blocks firmly to the base. The pillow block 32 contains a ball bearing 40, and pillow block 34 contains ball bearing 42, Shaft 30 is connected to shaft 44 of electric motor 14 by a coupling 46 having a flange 48 connected to the left hand end of shaft 30, as viewed in FIG. 1, a flange 50 connected to motor shaft 44, and a flexible element 52 interconnecting the two coupling flanges for transmitting the torgue from the motor to the shaft and for compensating for any minor misalignments which may be present between shafts 30 and 44. The hub 47 of flange 48 of the coupling is journaled in bearing 40, and a bushing 54, which has a straight bore around shaft 30 and a tapered outside, is pressed into a mating taper of the bore of fixed flange 60. This hub and bushing structure is disclosed and claimed in copending application Ser. No. 201,734, filed on Oct. 29, 1980 (common assignee). The movable flange 70 of the sheave assembly 12 is connected to hub 72 which is mounted on shaft 30 and is preferably provided with low friction bushings 74 and 76 so that the sheave will move with little resistance from friction along shaft 30 as the pitch and axial position of the sheave are varied in accordance with output speed requirements. The sheave flange 70 and hub 72 are moved axially along shaft 30 by a fluid operated device 80 connected on one side to flange 70 by a plate 82 and a plurality of screws 84 extending through the plate into bosses 86 on the outside surface of movable flange 70. A flexible element 90 of elastomeric material is connected on the inner side to plate 82 by an annular bead 92 disposed in an annular groove 94 on the plate. The opposite side of flexible element 90 is connected to a plate 96 by an annular bead 98 clamped to the periphery of plate 96 by an annular clamping ring 100 secured to the periphery of the plate by a plurality of screws 102 spaced around the periphery of plate 96. Plate 96 is rigidly secured to shaft 30 by tapered bushing 104 seated in a tapered hub of the plate and secured therein by a plurality of screws 106 extending through the flange on the bushing into the hub of the plate 96, thereby being secured to the shaft for rotation therewith, and is preferably keyed to the shaft by a key 108. Element 90, plate 82 and plate 96 form an assembly which is essentially fluid tight and which defines a fluid chamber 110 connected to a source of fluid, preferably air under pressure, by passages 112 and 114 in shaft 30, passage 112 being connected to a rotatable coupling 116 mounted on the end of the shaft, and through a conduit to the source of controlled air pressure.

The position of flange 70 is varied relative to flange 60 to change the pitch of the sheave, by varying the pressure in chamber 110 through the control system, hereinafter described, which regulates the flow of air into and from the chamber through passages 112 and 114. While fluids other than air may be used, the preferred embodiment utilizes air pressure for controlling the pressure in chamber 110 to vary the position of sheave flange 70.

In addition to functioning as the actuator for positioning flange 70 along shaft 30, element 90 also serves as the torque transmitting element between shaft 30 and flange 70. The components for transmitting this torque consist of plate 96 secured rigidly to shaft 30, element 90, and plate 82 rigidly connected to flange 70. The flange is not connected to the shaft by a key or spline, but, except for the element 90, is free to rotate on shaft 30. Any appreciable rotation between the shaft 30 and flange 70 is prevented by the coupling effect of element 90 between the shaft and the flange. The element is preferably constructed of rubber or rubber-like material with interspersed layers of fabric so that the two side walls of the element will expand and contract freely laterally, without the diameter of the element increasing or decreasing appreciably, as the pressure in chamber 110 is varied in the operation of varying the position of flange 70 on shaft 30. The chamber 110 is sealed along shaft 30 by seal 120 disposed in the end of hub 72, and seal 122 disposed in the adjacent end of the hub of plate 96. Since the beads 92 and 98 on opposite sides of element 90 form a seal with the peripheral portions of plates 82 and 96, chamber 110 is completely closed with the exception of passages 112 and 114. The foregoing fluid operated device 80 is disposed and claimed in copending applications Ser. Nos. 183,627 and 191,316, filed Sept. 2, 1980, and Sept. 26, 1980, respectively. The sheave assembly 16 consists of a fixed flange 130 mounted on shaft 132 and secured thereto, and a movable flange 136 mounted on the shaft for axial and rotational movement thereon. Flange 130 is secured to the shaft by a tapered bushing 138 and three bolts extending through the bushing into the hub of flange 130. The shaft 132 is supported by pillow blocks 140 and 142 bolted by a plurality of bolts to base 20, the shaft being journaled in bearings 146 and 148 of pillow blocks 140 and 142, respectively. The shaft, which has shoulders 150 and 152 adjacent bearings 146 and 148 to prevent axial movement of the shaft, extends outwardly beyond the two bearings to permit the shaft to be coupled at either end to the equipment to be driven. Movable flange 136 is constantly urged toward the other flange by a coil spring 154 disposed around hub 155 and reacting between the external surface of the flange and a cam assembly indicated generally by numeral 160. Spring 154 is of low rate and provides non-linear force against flange 136. Its main function is preloading the flange during start-up and slow-down, the torque sensing cam providing almost all axial force on flange 136. Thus, when flange 70 of the sheave assembly 12 is changed by moving flange 70 toward flange 60 to increase the speed of the drive, the pressure applied by the belt as a result of the movement of flange 70 causes flange 136 to move away from flange 130, and when flange 70 is moved away from flange 60, the relief of pressure by the belt on flanges 130 and 136 permits the spring and cam to move the flange 136 axially toward flange 130.

In order to assist in maintaining the proper position of flange 136 relative to flange 130 for any given load and/or selected speed of sheave assembly 12, a cam assembly 160 is utilized which includes a cam element 162 having a plurality of bi-directional cam surfaces thereon for engaging a plurality of respective cam followers 166 mounted on lugs 168 on the external surface of movable flange 136. As the load increases, additional force is applied to the belt and flange 136, which in turn causes the cam followers to move up the respective cam surfaces to prevent flange 136 from moving excessively away from flange 130 under the influence of heavy loading of the drive. If desired, this movement may cause a corresponding movement of flange 70 away from flange 60. This is possible in view of the resilient effective provided by flexible element 90 and the air in chamber 110, the air in the chamber being compressed either by the belt force and the movement of flange 70 or by a pressure control device in the air pressure control system. The cam 160 is rigidly secured to shaft 132 by a bushing 170 and a plurality of screws 172 extending through a flange on the bushing into the cam. A key 174 may be provided between bushing 170 and the shaft so that the cam is firmly secured to the shaft against both axial and angular movement relative thereto.

The control system for the variable speed drive disclosed herein is shown schematically in FIG. 2 and consists generally of a control 180 which controls the pressure of the fluid transmitted to fluid operated device 80 through a line 182. The control is regulated in response to a command pressure source 183 which may sense, indirectly, the flow of air or the pressure in a duct or other similar fluid transmitting passage (not shown), and further in response to a pressure created by a fan or the like 184 mounted on and driven by shaft 132, thus providing a fluid pressure indicative of the output speed of the variable speed drive. The command pressure is transmitted from source 183 through a conduit 185. The pressure from the fan is transmitted by a conduit 186 to a chamber 188 and exerts pressure on diaphragm 190 to control lever 192 through pin 193. The pressure for operating fluid device 80 is obtained from a suitable constant pressure source such as the compressed air line of the plant or building in which the equipment is installed. The source, indicated by numeral 195, is connected to control 180 by line 194 in which are disposed a filter and regulator element 196 and a solenoid valve 198. The speed command is indicated in FIG. 2 as operable in a range of 3 to 15 PSI and the source of operating fluid is indicated as a substantially constant 20 PSI. The fan 184 is shown schematically in FIG. 3, and consists of a housing 200, a rotor 202 having radially extending blades 204, and outlets 206 and 208. Only one of the two outlets operates at any one time, depending upon which direction the rotor is rotating, this arrangement being provided for the purpose of permitting the control system to be used regardless of the direction in which the variable speed drive is driven. Valves are disposed in the lines leading from outlets 206 and 208 to permit either outlet to supply pressure depending on the direction of rotation of the fan.

Referring to FIG. 4, the control 180 is illustrated in cross section, showing the various operating parts responsive to the fan and command pressures for controlling the pressure from the source 195 to fluid operating device 80. The various conduits identified in FIG. 2 are identified in FIG. 4. The operating pressure from the source 195 is controlled by a valve 210 which regulates the air passing through conduit 194 to conduit 182. A member 212 is pivoted on pin or screw 214, and the pressure in chamber 216 acts on diaphragm 218 which urges member 212 in a counterclockwise direction to cause adjustment screw 220 to move downwardly to open valve 210. This permits the flow of air through the valve into chamber 222 and from there into conduit 182 and to fluid operated device 80. When the rotation of sheave 16 of the drive has increased to the speed required to satisfy the flow of air through the duct or other passage sensed by the speed command, the pressure created by fan 184 in chamber 188 moves lever 192 upwardly, raising screw 220 sufficiently to either restrict or completely shut off valve 210. Valve 230 either remains closed to hold the air pressure in fluid operated device 80 or, if the pressure in chamber 188 is in excess of the required pressure, valve 230 is opened to permit air to bleed back from passage 182 to obtain the required pressure in device 80, for maintaining the desired speed of the variable speed drive. A coil spring 232 of a selected rate is disposed in the chamber to permit adjustment or fine tuning of the control of obtain the desired movement of valves 210 and 230 in response to the command and fan pressures.

In the operation of the present control system, when the sensing device connected to conduit 185 gives a signal for increasing, for example, the pressure or flow of air in the duct or other fluid transmitting passageway, the increased pressure in conduit 185 is transmitted to chamber 216, which applies an upward pressure to the right hand end of member 212, thereby pivoting the left hand end of the lever downwardly, causing adjustment screw 220 to open valve 210 and admit the operating air from passage 194 into the control. The air flows through the control and outwardly through passage 182 to the fluid operated device 80. When this action takes place, flange 70 is moved toward flange 60, causing the belt 18 to move outwardly toward the periphery of the two flanges. This in turn causes the belt to apply a greater force against flanges 130 and 136, and hence to move inwardly, thus resulting in an increased speed of rotation of shaft 132. As this takes place, the fan 184 increases in the output of air and hence causes an increase in air pressure in line 206 and chamber 188. When this occurs, diaphragm 190 and pin 193 move upwardly, moving lever 192, which causes the left hand end of the lever 212 to pivot upwardly and close or restrict valve 210, and, if required, open valve 230 to maintain or lower the pressure in fluid operated device 80. For any particular setting or signal from the speed command 183, the pressure in chamber 188 remains substantially constant, thereby maintaining the desired speed of the variable speed device. Any change in either direction in the speed command operates in the foregoing manner to reset the control to provide the required pressure in the fluid operated device 80 to adjust the speed of the output shaft 132 and fan 184 to obtain the pressures required to obtain an equilibrium in the control corresponding to the new signal from the command 183.

While the control system described in detail herein is particularly adapted for controlling a variable speed belt drive of the type shown in FIG. 1, the system can be adapted to various other types of drives and systems. Further, the fluid signal and control pressures may be either air or other gas, and with certain modifications, one or more of the fluids may be hydraulic fluid.

While only one embodiment of the present control system for variable speed drives has been described in detail herein, various changes and modifications may be made without departing from the scope of the invention.

I claim:

1. A control system for variable speed drives having input and output sheaves with axially movable flanges and a belt interconnecting the sheaves: a fluid pressure actuated means for controlling the position of the movable flange of the input sheaves; a fluid pressure creating means responsive to the speed of the output sheave; a source of command pressure; a source of operating pressure; a control device having a control member, a fluid inlet and outlet valve means operated by said control member, and a chamber having a movable wall responsive to variations in said command pressure for moving said control member; a conduit connecting said operating pressure with said valve means; a chamber connected to said pressure creating means and having a movable wall; means connecting said last mentioned movable wall with said control member for varying said valve means in response to variations in said pressure creating means; and a conduit connecting said valve means with said fluid pressure actuated means for controlling the position of the movable flange of the input sheave in response to variation in pressure from said pressure creating means and from said command pressure source.

2. A control system for variable speed drives as defined in claim 1 in which said fluid pressure creating means responsive to the speed of the output sheave is a fan, and said movable wall of the chamber connected to said pressure creating means is responsive to the pressure created by said fan irrespective of the direction of rotation thereof.

3. A control system for variable speed drives as defined in claim 2 in which said fluid pressure actuated means for controlling the position of the movable flange on the input sheave includes a pneumatically operated member disposed axially with respect to the sheave and connected to the movable flange for changing the pitch of the input sheave in response to variations in pressure from the pressure creating means and from the command pressure source.

4. A control system for variable speed drives as defined in claim 2 in which said fluid pressure actuated means for controlling the position of the movable flange on the input shaft includes a pneumatically operable member movable in response to changes in air pressure therein, and said fluid pressure creating means responsive to the speed of the output sheave produces a variable air pressure in said chamber connected to said pressure creating means, and in which said source of operating pressure includes a line supplying a substantially constant air pressure.

5. A control system for variable speed drives as defined in claim 1 in which said fluid pressure actuated means for controlling the position of the movable flange on the input sheave includes a pneumatically operated member disposed axially with respect to the sheave and connected to the movable flange for changing the pitch of the input sheave in response to variations in pressure from the pressure creating means and from the command/presssure source.

6. A control system for variable speed drives as defined in claim 1 in which said fluid pressure actuated means for controlling the position of the movable flange on the input shaft includes a pneumatically operable member movable in response to changes in air pressure therein, and in which said source of operating pressure includes a line supplying a substantially constant air pressure.

7. A control system for variable speed drives having input and output sheaves with axially movable flanges and a belt interconnecting said sheaves: a control mechanism, a fluid pressure actuated means connected to said control mechanism for controlling the position of the movable flange of the input sheave, a fluid pressure creating means responsive to the speed of the output sheave connected to said control mechanism, a source of command pressure connected to said control mechanism, a source of operating pressure connected to said control mechanism, means in said control mechanism for regulating the pressure from said source of operating pressure to said fluid pressure actuated means for controlling the position of the movable flange of the input sheave in response to variations in pressure from the pressure creating means and from said command pressure source.

8. A control system for variable speed drives as defined in claim 7 in which said fluid pressure creating means responsive to the speed of the output sheave is a fan.

9. A control system for variable speed drives as defined in claim 8 in which said fluid pressure actuated means for controlling the position of the movable flange on the input shaft includes a pneumatically operable member movable in response to changes in air pressure therein, and said fluid pressure creating means responsive to the speed of the output sheave produces a variable air pressure in said control mechanism connected to said pressure creating means, and in which said source of operating pressure includes a line supplying a substantially constant air pressure.

10. A control system for variable speed drives as defined in claim 8 in which said fluid pressure actuated means for controlling the position of the movable flange on the input sheave includes a pneumatically operated member disposed axially with respect to the sheave and connected to the movable flange for changing the pitch of the input sheave in response to variations in pressure from the pressure creating means and from the command pressure source.

11. A control system for variable speed drives as defined in claim 7 in which said fluid pressure actuated means for controlling the position of the movable flange on the input sheave includes a pneumatically operated member disposed axially with respect to the sheave and connected to the movable flange for changing the pitch of the input sheave in response to variations in pressure from the pressure creating means and from the command pressure source.

12. A control system for variable speed drives as defined in claim 7 in which said fluid pressure actuated means for controlling the position of the movable flange on the input shaft includes a pneumatically operable member movable in response to changes in air pressure therein, and in which said source of operating pressure includes a line for supplying a substantially constant air pressure.

13. A control system for a variable speed belt drive having a rotatable input element with a movable flange, a rotatable output element and a speed control element: a control mechanism, a fluid pressure actuated means connected to said control mechanism for regulating the speed of said input element, a fluid pressure creating means responsive to the speed of said output element connected to said control mechanism, a source of command pressure connected to said control mechanism, a source of operating pressure connected to said control mechanism, and means in said control mechanism for regulating the pressure from said source of operating pressure to said speed control element for controlling the speed of said rotatable input element in response to variations in pressure from the pressure creating means and from said command pressure source.

14. A control system for variable speed belt drives as defined in claim 13 in which said fluid pressure creating means responsive to the speed of the output element consists of a fan, and means is included which senses the pressure created by said fan irrespective of the direction of rotation thereof.

15. A control system for variable speed belt drives as defined in claim 14 in which said fluid pressure actuated means controls the position of the movable flange on the input element and includes a pneumatically operated member disposed axially with respect to the input element and connected to the movable flange for changing the position of the flange of said input element in response to variations in pressure from the pressure creating means and from the command pressure source.

16. A control system for variable speed belt drives as defined in claim 13 in which said fluid pressure actuated means controls the position of the movable flange on the input element and includes a pneumatically operated member disposed axially with respect to the input element and connected to the movable flange for changing the position of the flange of said input element in response to variations in pressure from the pressure creating means and from the command pressure source.

17. A control system for variable speed belt drives as defined in claim 13 in which said fluid pressure actuated means for controlling the position of the movable flange on the input element includes a pneumatically operable member movable in response to changes in air pressure therein, and in which said source of operating pressure includes a line supplying a substantially constant air pressure.

* * * * *